(12) United States Patent
Kaneko

(10) Patent No.: US 11,188,055 B2
(45) Date of Patent: *Nov. 30, 2021

(54) MANAGEMENT SYSTEM AND METHOD THEREOF

(71) Applicant: CANON KABUSHIKI KAISHA, Tokyo (JP)

(72) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,952

(22) Filed: Apr. 28, 2020

(65) Prior Publication Data

US 2020/0257265 A1  Aug. 13, 2020

Related U.S. Application Data

(63) Continuation of application No. 15/472,082, filed on Mar. 28, 2017.

(30) Foreign Application Priority Data

Mar. 30, 2016  (JP) .................................. 2016-069175

(51) Int. Cl.
*H04L 29/08* (2006.01)
*G05B 19/4097* (2006.01)
*B33Y 10/00* (2015.01)
*B33Y 50/02* (2015.01)

(52) U.S. Cl.
CPC .......... *G05B 19/4097* (2013.01); *B33Y 10/00* (2014.12); *B33Y 50/02* (2014.12); *G05B 2219/49007* (2013.01)

(58) Field of Classification Search
CPC ................................................. G05B 19/4097
See application file for complete search history.

(56) References Cited

FOREIGN PATENT DOCUMENTS

CN  1506777 A  6/2004
CN  103152506 A  6/2013

*Primary Examiner* — Adnan M Mirza
(74) *Attorney, Agent, or Firm* — Canon U.S.A., Inc. IP Division

(57) ABSTRACT

A monitoring apparatus for monitoring a modeling apparatus configured to form a three-dimensional object obtains a number of times of stacking cumulatively counted and recorded in a storage unit of the modeling apparatus each time forming processing of the three-dimensional object to be performed by a forming device of the modeling apparatus is performed, generates a message including identification information for identifying the modeling apparatus and the acquired number of times of stacking, and transmits the generated message to a management system.

22 Claims, 8 Drawing Sheets

MATERIAL SHEET LAMINATION

INKJET

MANAGEMENT SYSTEM AND METHOD THEREOF

CROSS-REFERENCE TO RELATED APPLICATIONS

This application is a Continuation of U.S. patent application Ser. No. 15/472,082, filed Mar. 28, 2017, which claims the benefit of Japanese Patent Application No. 2016-069175, filed Mar. 30, 2016, both of which are hereby incorporated by reference herein in their entirety.

BACKGROUND OF THE INVENTION

Field of the Invention

The present invention relates to a mechanism of a management system for managing a modeling apparatus by using network communication.

Description of the Related Art

There have heretofore been systems which collect operation information about image forming apparatuses for forming an image on a sheet, such as a printing apparatus and a copying machine, via a network and do maintenance. For example, Japanese Patent Application Laid-Open No. 2003-159854 discusses a technique for receiving a notification related to the remaining amount of a consumable, such as toner, from an image forming apparatus and performs inventory management of the consumable. To improve the accuracy of the inventory management, the technique discussed in Japanese Patent Application Laid-Open No. 2003-159854 uses a value of a total counter, which is included in the notification related to the remaining amount. The value of the total counter indicates the number of printed sheets cumulatively counted since a start of operation of the image forming apparatus. According to Japanese Patent Application Laid-Open No. 2003-159854, a management system can appropriately identify an amount of operation of the image forming apparatus in a specific period by referring to a change in the value of the total counter.

Modeling apparatuses, for example three-dimensional (3D) object forming apparatus (so-called 3D printers), for forming a 3D object have become widely used in recent years. The foregoing management system may be used to do maintenance of modeling apparatuses on a network in the future.

There are various modeling methods to be used by 3D printers, and objects to be formed by the 3D printers also vary, so that it can be difficult to identify operation statuses of modeling apparatuses appropriately by a management system in a remote location over a network. Under the present circumstances, the values of total counters of the 3D printers, which are cumulatively counted to reflect the operation statuses in a comprehensive manner regardless of what modeling processing is performed in a specific period and are equivalent to the number of printed sheets according to the conventional technique, are not able to be collected.

SUMMARY OF THE INVENTION

The present invention is directed to a mechanism for collecting new information for appropriately identifying an operation status via a network from a modeling apparatus which can be a management target of a management system.

According to an aspect of the present invention, a monitoring apparatus for monitoring a modeling apparatus configured to form a three-dimensional object acquires a number of times of stacking cumulatively counted and recorded in a storage unit of the modeling apparatus each time forming processing of the three-dimensional object to be performed by a forming device of the modeling apparatus is performed, generates a message including identification information for identifying the modeling apparatus and the acquired number of times of stacking, and transmits the generated message to a management system.

Further features of the present invention will become apparent from the following description of exemplary embodiments with reference to the attached drawings.

DESCRIPTION OF THE EMBODIMENTS

An exemplary embodiment of the present invention will be described below with reference to the drawings.

Figure 1:
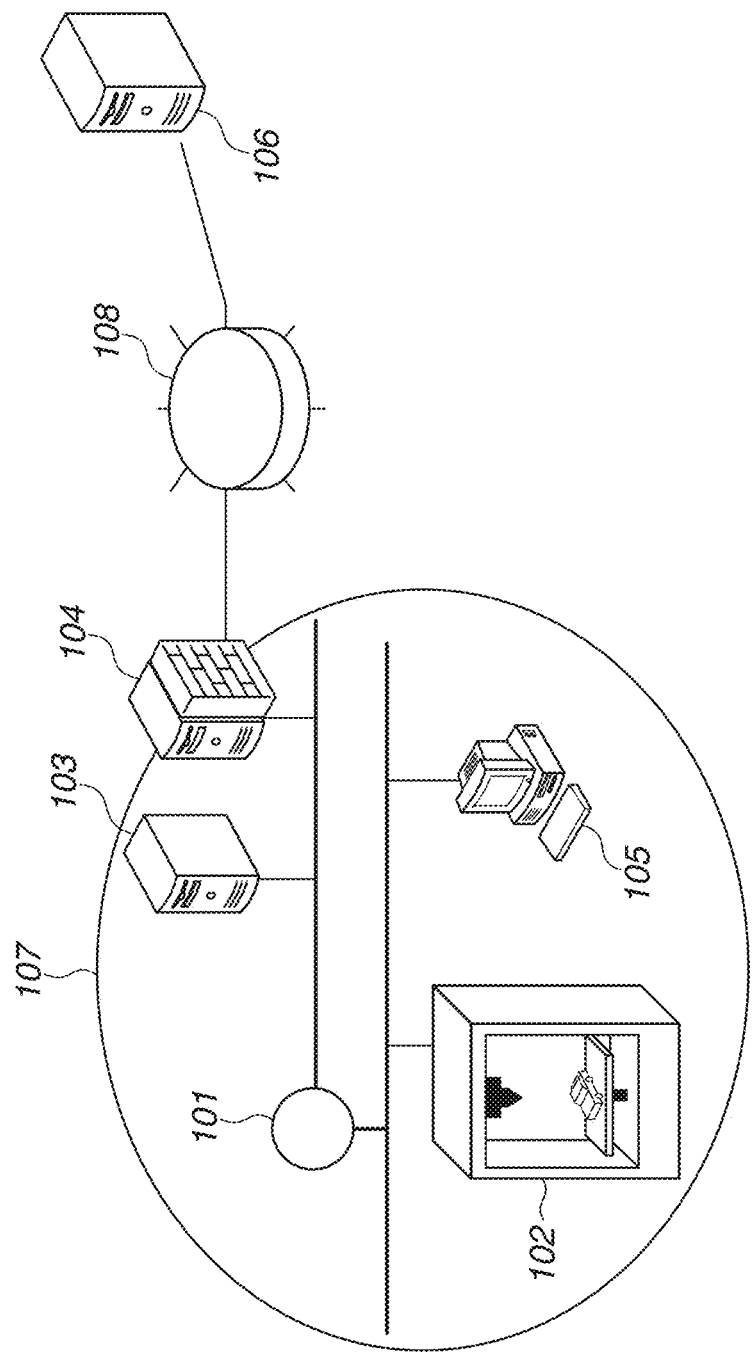
FIG. 1 is a diagram illustrating a configuration example of a network system including a modeling apparatus and a management system according to an exemplary embodiment of the present invention.

FIG. 1 is a diagram illustrating a configuration example of a network system including a modeling apparatus (a three-dimensional (3D) object forming apparatus) and a management system according to an exemplary embodiment of the present invention.

In FIG. 1, a modeling apparatus 102 is an apparatus for forming a 3D object based on model data. A firewall 104 is installed to enhance the security of an intranet. A personal computer (PC) 105 is used by a general user for work. The modeling apparatus 102, a proxy server 103, the firewall 104, and the PC 105 are connected to each other via a local area network (LAN) 101. The PC 105 can transmit, to the modeling apparatus 102, model data for a 3D object to be formed. In FIG. 1, an installation environment 107 of the modeling apparatus 102 includes an intranet including the proxy server 103 and the firewall 104. A plurality of modeling apparatuses may be installed on the intranet.

A management system 106 is a system for managing one or more modeling apparatuses. The management system 106 communicates with the apparatuses in the installation environment 107 via the Internet 108. The management system 106 includes one or more server computers. The management system 106 mainly collects operation information about the modeling apparatus 102, and provides management services based on the operation information. Examples of the management services include arrangement of maintenance of the modeling apparatus 102 and reporting.

The modeling apparatus 102 includes a built-in monitoring apparatus which includes a function of transmitting device information and operation information to the management system 106. The device information includes individual identification information and model information about the own apparatus. The operation information includes failure information and status information.

The monitoring apparatus including the function of transmitting the device information and the operation information about the modeling apparatus 102 may be installed on the LAN 101, separately from the modeling apparatus 102. In such a case, the monitoring apparatus may obtain device information and operation information from one or more modeling apparatuses on the LAN 101, and transmit the obtained information to the management system 106.

In the present exemplary embodiment, communication protocols between the monitoring apparatus and the management system 106 are assumed to be, but not limited to, such protocols as the Hypertext Transfer Protocol (HTTP) and HTTP Secure (HTTPS). Various communication protocols such as WebSocket and Simple Mail Transfer Protocol (SMTP) may be used.

Figure 2A:
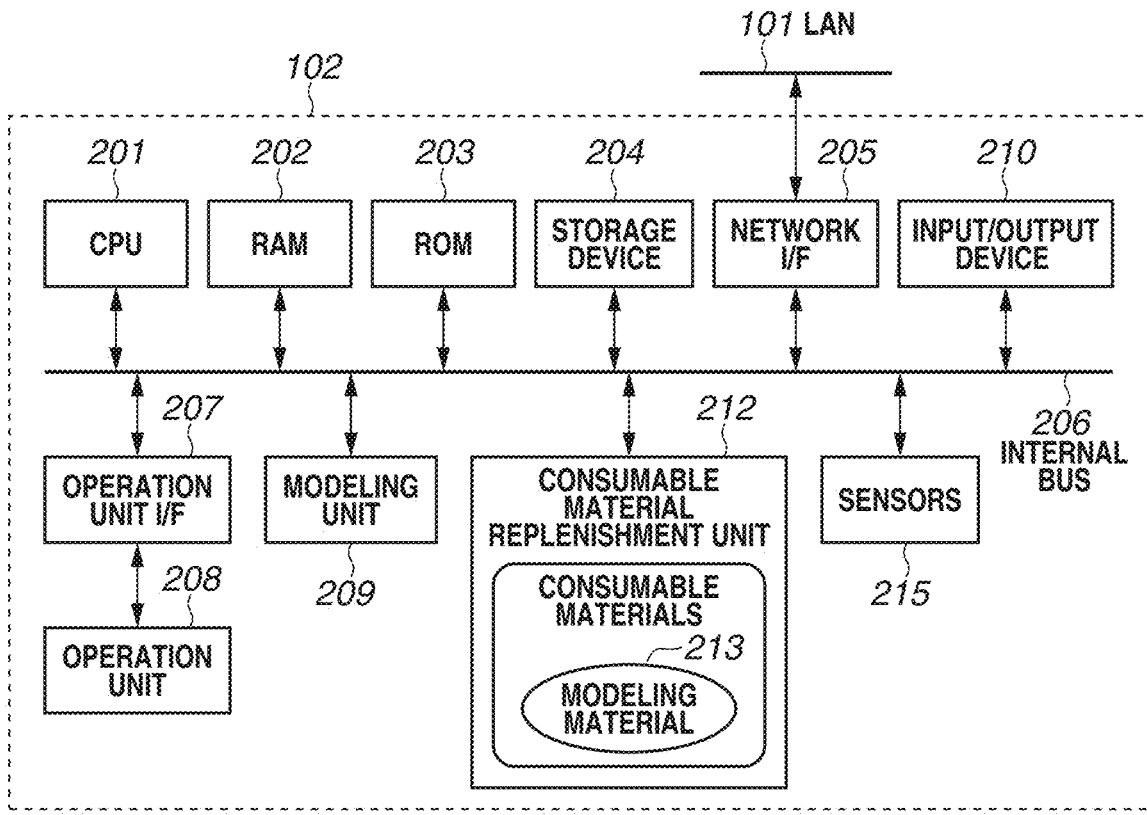
FIGS. 2A and 2B are diagrams illustrating examples of a hardware configuration of apparatuses constituting the network system according to the exemplary embodiment of the present invention.
Figure 2B:
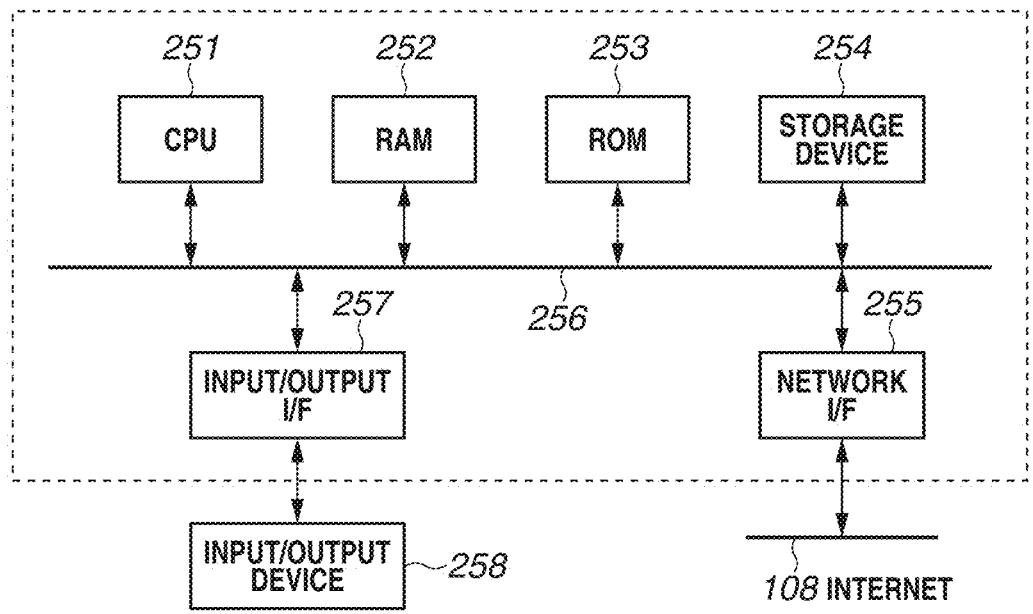

FIGS. 2A and 2B are diagrams illustrating examples of a hardware configuration of the apparatuses constituting the network system according to the exemplary embodiment of the present invention.

FIG. 2A illustrates an example of a hardware configuration of the modeling apparatus 102. A central processing unit (CPU) 201 executes programs stored in a read-only memory (ROM) 203 and a storage device 204 to control devices via an internal bus 206 in a centralized manner. A random access memory (RAM) 202 functions as a memory and a work area of the CPU 201. Preinstalled programs and data are stored in the ROM 203. The ROM 203 further stores individual identification information, model information, and destination information. The destination information indicates a region for which the modeling apparatus 102 is shipped. A language displayed on an input/output device 210 is determined according to the destination information. A network interface (I/F) 205 is used to unidirectionally or bidirectionally exchanging data with an external network device or the PC 105 via the LAN 101.

The storage device 204 functions as an external storage device. The storage device 204 stores modeling data. The storage device 204 can store operation information detected and recorded inside the modeling apparatus 102 and information about consumable materials instead of the RAM 202. The storage device 204 also stores a program for implementing the function of the monitoring apparatus. The operation information includes failure information, status information, and log information. The operation information stored in the storage device 204 is obtained by the monitoring apparatus and transmitted to the management system 106 via a network such as the Internet 108.

An operation unit 208 represents a configuration in charge of input and output in the modeling apparatus 102. Specifically, the operation unit 208 accepts inputs (such as button inputs) from users and transmits signals corresponding to the inputs to the processing units described above via an operation unit I/F 207. The operation unit 208 further includes a display device (such as a touch panel) for providing needed information to users and accepting user operations.

A modeling unit (a 3D object forming device) 209 includes a modeling stage for stacking, on the upper side or the bottom side of an object to be formed, modeling materials in the shape of a layer to form a 3D object, and a configuration for applying effects and finishing to the object and forming support portions. As employed herein, modeling processing (a 3D object forming processing) performed by the modeling unit 209 will be referred to as the additive manufacturing technology. The additive manufacturing is performed by using modeling commands (forming commands) about sectional shape data in units of stacked surfaces (i.e., slice data) generated from model data by a 3D modeling application installed in the PC 105. An internal configuration of the modeling unit 209 includes a hardware configuration dependent on the modeling method supported by the modeling apparatus 102. Examples of the modeling method to which an exemplary embodiment of the present invention is applicable will be described below with reference to FIGS. 4A and 4B.

A consumable material replenishment unit 212 supplies consumable materials including a modeling material 213 needed to form an object to the modeling unit 209. If the modeling apparatus 102 employs a modeling method in which support portions are formed in forming an object, the consumable material replenishment unit 212 also supplies support materials stored therein as consumable materials to the modeling unit 209. There are various types of modeling materials 213. Examples include photocurable resin (photopolymer), thermoplastic resin, metal powder, and plaster material. Examples of the photocurable resin include liquid resins that cure when irradiated with ultraviolet rays.

The consumable material replenishment unit 212 can manage the amounts of the modeling material 213 and support materials supplied to the modeling unit 209. The supply amounts can be recorded as a log in the storage device 204. The supply amounts for one object (one job) are recorded in a record of the log. The log may be recorded by a method other than on an object-by-object basis. For example, the supply amounts in a predetermined period may be recorded. If the modeling apparatus 102 is capable of color modeling in a plurality of colors, the consumable material replenishment unit 212 can supply modeling materials 213 of the respective plurality of colors to the modeling unit 209 and manage the supply amounts separately. The supply amounts can be recorded as a log in the storage device 204.

To supply the consumable materials to the consumable material replenishment unit 212, bottles containing the modeling material 213 and other consumable materials in a liquid or powder form may be mounted on the consumable material replenishment unit 212. The consumable materials may be manually supplied to the consumable material replenishment unit 212 using dedicated bottles.

A plurality of sensors 215 for different purposes is arranged inside the modeling apparatus 102. Some of the main examples of the sensors 215 arranged inside the modeling apparatus 102 will be described.

Some sensors detect the supply amounts of the consumable materials managed by the consumable material replenishment unit 212 to the modeling unit 209 and detect the remaining amounts of the consumable materials stored in the consumable material replenishment unit 212. A sensor that detects the attachment of a bottle containing the modeling material 213 and detects identification information about the bottle may be arranged inside the modeling apparatus 102.

A sensor that detects an abnormal temperature or a failure inside the modeling unit 209 is arranged therein. If the modeling unit 209 includes a modeling head and stage for modeling processing, sensors for counting the numbers of times of driving (traveling distances) thereof are also arranged.

Other examples include a sensor that counts the number of surfaces of the modeling material 213 actually stacked by the modeling unit 209 as layer counter information. If the modeling apparatus 102 and the modeling unit 209 are normally operating, the number of stacked surfaces roughly coincides with the number of pieces of slice data corresponding to the modeling data used in the modeling processing performed by the modeling unit 209. In fact, some slice data may have been unused in the modeling processing due to factors such as a failure. Stacking processing may be performed for maintenance purposes. The total number of stacked surfaces counted by the sensor and the total number of pieces of slice data in the same period therefore do not necessarily coincide with each other.

The foregoing sensors are described to be prepared as hardware. However, part or all of the sensors may be replaced by software sensors having equivalent detection functions.

The modeling apparatus 102 includes optional devices such as auxiliary equipment needed for some modeling methods and peripheral devices (not-illustrated) for enhancing the functions and mechanisms of a 3D printer. Examples of the auxiliary equipment include a device which is needed to solve power issues in the case of an inkjet method and a cleaning device which is needed in the case of a stereolithographic method (stereolithography apparatus (SLA)). Examples of the peripheral devices include a camera and an integrated circuit (IC) card reader.

FIG. 2B is a diagram illustrating a hardware configuration example of an information processing apparatus. Examples of the information processing apparatus include the PC 105 and the one or more serve computers constituting the management system 106 according to the exemplary embodiment of the present invention. If the monitoring apparatus is installed outside the modeling apparatus 102, the monitoring apparatus also includes a configuration similar to that of the illustrated information processing apparatus. The program for implementing the function of the monitoring apparatus is then executed in the information processing apparatus.

A CPU 251 executes programs stored in a ROM 253 and a storage device 254 to control the entire information processing apparatus via an internal bus 256. The ROM 253 and the storage device 254 also store various types of data other than the programs. For example, the storage device 254 can store the device information and the operation information about the modeling apparatus 102. A RAM 252 functions as a memory and a work area of the CPU 201. Examples of an input/output I/F 257 include a personal system/2 (PS/2), Universal Serial Bus (USB), and analog and digital display I/Fs. An input/output device 258 includes a keyboard, a mouse, a cathode-ray tube (CRT), and/or a liquid crystal display. The input/output device 258 can be connected to the information processing apparatus via the input/output I/F 257. The information processing apparatus performs communication via the LAN 101 and the Internet 108 using a network I/F 255.

Figure 3A:
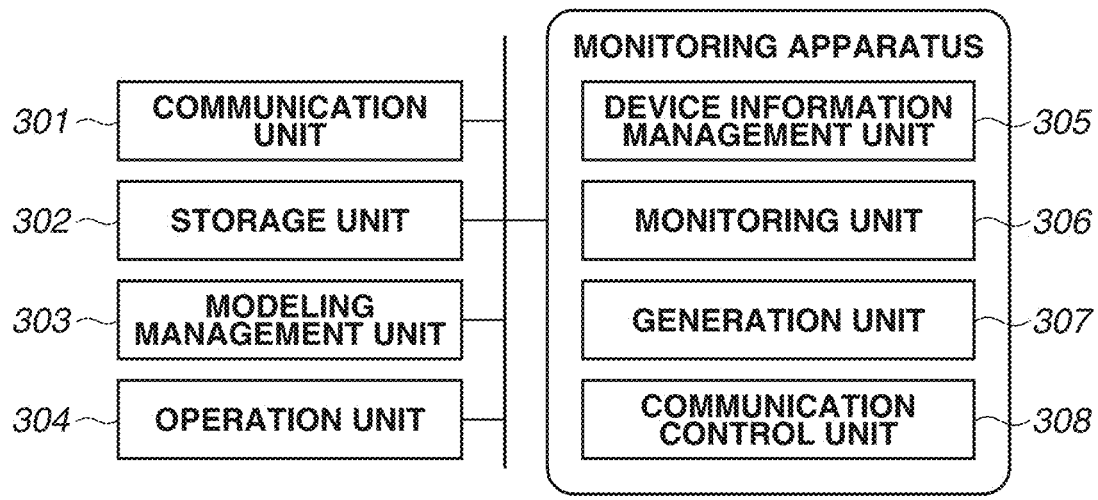
FIGS. 3A and 3B are diagrams illustrating examples of a software module configuration of the apparatuses constituting the network system according to the exemplary embodiment of the present invention.
Figure 3B:
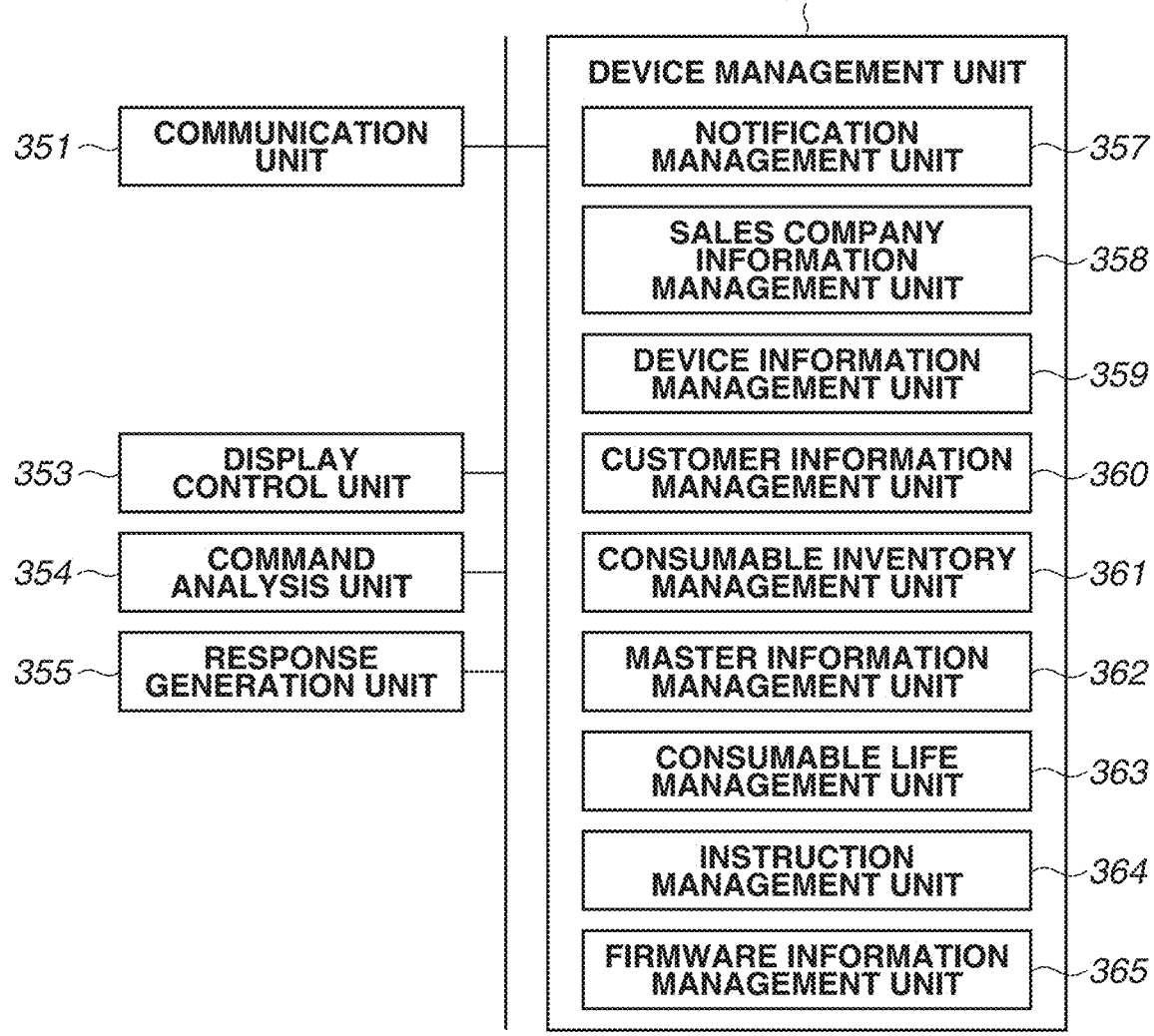

FIGS. 3A and 3B are diagrams illustrating examples of a software module configuration of the apparatuses constituting the network system according to the exemplary embodiment of the present invention. Such configurations represent virtual modules serving as main components implemented by executing programs according to the exemplary embodiment of the present invention. The illustrated configurations are mere examples, and different module configurations may be employed as long as the processing described below can be implemented.

FIG. 3A is a diagram for describing a software module configuration of the modeling apparatus 102.

A communication unit 301 communicates with external apparatuses such as the management system 106 via the network I/F 205. A storage unit 302 records operation information detected by the hardware or software sensors mainly into the storage device 204. The storage unit 302 also records the device information about the modeling apparatus 102 into the storage device 204. The device information includes the individual identification information and model information about the modeling apparatus 102, vendor information indicating a manufacturer, and communication information such as an Internet Protocol (IP) address and a Media Access Control (MAC) address.

A modeling management unit 303 performs modeling control according to modeling commands to the modeling unit 209, and control for supplying consumable materials to the consumable material replenishment unit 212. An operation unit 304 accepts operations on the modeling apparatus 102, including the user's instructions to perform modeling.

A device information management unit 305, a monitoring unit 306, a generation unit 307, and a communication control unit 308 are module configurations corresponding to the function of the monitoring apparatus.

The device information management unit 305 manages the device information about the modeling apparatus 102 to be monitored using the storage device 204. The monitoring unit 306 monitors a state of the modeling apparatus 102. Specifically, the monitoring unit 306 implements a monitoring function of referring to the operation information recorded in the storage device 204 of the modeling apparatus 102 and determining whether there is information to be notified as an event (such as occurrence of a fault and recovery from a fault). The monitoring unit 306 further determines whether a notification about a consumable material needs to be made. The monitoring unit 306 accepts and reflects monitoring settings such as a data transmission schedule and a monitoring target event from the management system 106, received via the communication unit 301. The generation unit 307 generates messages such as an alarm and a service call including notification contents determined to need to be notified by the monitoring unit 306. The generation unit 307 also generates a message including operation information to be transmitted on a regular basis from the monitoring apparatus to the management system 106. The communication control unit 308 causes the communication unit 301 to transmit the messages generated by the generation unit 307 using a predetermined communication protocol.

If the monitoring apparatus exists outside the modeling apparatus 102, the modules corresponding to the functions of the storage device 204 in the modeling apparatus 102 and the monitoring apparatus exchange data via a network using a predetermined protocol (such as Simple Network Management Protocol (SNMP) and the Internet Printing Protocol (IPP)). The communication control unit 308 transmits the messages using the network I/F 255 of the monitoring apparatus.

FIG. 3B is a diagram illustrating a software module configuration of the management system 106.

A communication unit 351 includes a function for communicating with external apparatuses such as the modeling apparatus 102 and the monitoring apparatus using the network I/F 255. Specifically, the communication unit 351 accepts a message including the device information and the operation information about the modeling apparatus 102 via the monitoring device. The communication unit 351 also controls the transmission of a message including the monitoring settings of the monitoring apparatus.

A display control unit 353 provides screen information for displaying, on a web browser, the device information and the operation information stored in the storage device 254 or a not-illustrated storage service on the network. A World Wide Web (WWW) server program runs on the management system 106, whereby the device information can be browsed from an arbitrary PC by a serviceperson of a sales company.

A command analysis unit 354 analyzes data received from an external apparatus, and determines message contents included in the data. A message generation unit 355 generates messages including notifications and monitoring settings generated by a device management unit 356, and responses to requests from the modeling apparatus 102 and the monitoring apparatus.

The device management unit 356 is a configuration implemented by executing a dedicated program for managing the modeling apparatus 102 to be managed.

A notification management unit 357 specifies a notification destination (such as the monitoring apparatus and the sales company) and generates notification information needed. Examples of the notification generated here include a maintenance request notification to the serviceperson of the modeling apparatus 102 and a replenishment request notification about consumables.

A sales company information management unit 358 manages information about the sales company that provides maintenance of the modeling apparatus 102 to be managed, manages consumables, and arranges delivery. The sales company information is stored in the storage device 254 or the not-illustrated storage service on the network.

A device information management unit 359 manages the device information about the modeling apparatus 102 to be managed and the monitoring apparatus using the storage device 254 or the not-illustrated storage service on the network. Examples of the device information to be managed include the individual identification information about the modeling apparatus 102, information representing models and manufacturers, and communication information such as an IP address. The device information management unit 359 also manages an operation status (status) including an error and an alarm of the modeling apparatus 102 based on notification contents from the monitoring apparatus. Information for browsing the state of the modeling apparatus 102, managed by the device information management unit 359, is provided on the network in real time via the WWW server program. Such information is browsed by dispatchers and servicepersons of the sales company. The device information management unit 359 also manages failure information indicating statuses such as "unprocessed", "in process", and "processed" according to the status of handling by the sales company.

A customer information management unit 360 manages information about a customer who owns the modeling apparatus 102 to be managed. The information also includes information about a maintenance contract with the sales company. The maintenance contract covers maintenance agreements with each customer. Examples include regular delivery of consumable materials to the installation environment 107 of the modeling apparatus 102, regular maintenance work, and handling in the event of a failure.

A consumable inventory management unit 361 manages the quantities of consumables, such as consumable materials of the modeling apparatus 102 and replaceable components of the modeling apparatus 102, stocked by the customer. The consumables of which inventory is to be managed can be identified by identifiers (IDs) of the consumables. If the quantities of stocks satisfy a predetermined condition, a delivery request is automatically issued to the serviceperson by an email.

Specifically, the quantities of stocks can be managed based on messages indicating the remaining amounts of the consumable materials in the modeling apparatus 102 and messages including information indicating attrition rates of the components. Such messages are transmitted from the monitoring apparatus. The contents of the transmitted messages vary depending on the model of the modeling apparatus 102. Some apparatuses may transmit a message indicating the use amount of a consumable material. Some may transmit a message including information indicating identification information about replacement timing of a consumable or the dates of consumption before and after replacement.

A master information management unit 362 manages master information. The master information is needed to display the model information, failure information, and/or consumable information via the WWW server program, or for determination processing to be described below. Examples of the master information include registration information related to specifications, such as a product name corresponding to a specific model, usable consumable information, and performance information. In other words, performance of the modeling apparatus 102 (modeling method and types of consumable materials and consumable components used) can be identified from the information included in the message from the monitoring apparatus, such as the model of the modeling apparatus 102. The master information to be managed further includes information about an installation location of the modeling apparatus 102.

A consumable life management unit 363 manages a history of the lives of actually-used consumables based on replacement information about the consumables of the modeling apparatus 102, transmitted via the monitoring apparatus. Based on the history, average lives of the consumables in actual operation can be calculated.

An instruction management unit 364 generates and manages instructions to be transmitted to the monitoring apparatus. The generated instructions are transmitted to the monitoring apparatus by the communication unit 351. Examples of the instructions include instructions to change the schedule of transmission to the management system 106, to change the type of event to be notified, to update firmware, and to reboot. The instruction management unit 364 manages results of execution of the instructions as statuses such as "successful", "failed", and "unknown".

A firmware information management unit 365 manages firmware vision information about the modeling apparatus 102. The firmware information management unit 365 makes distribution settings of firmware in cooperation with a firmware management system (not illustrated). The firmware management system distributes the firmware according to the distribution settings.

Figure 4A:
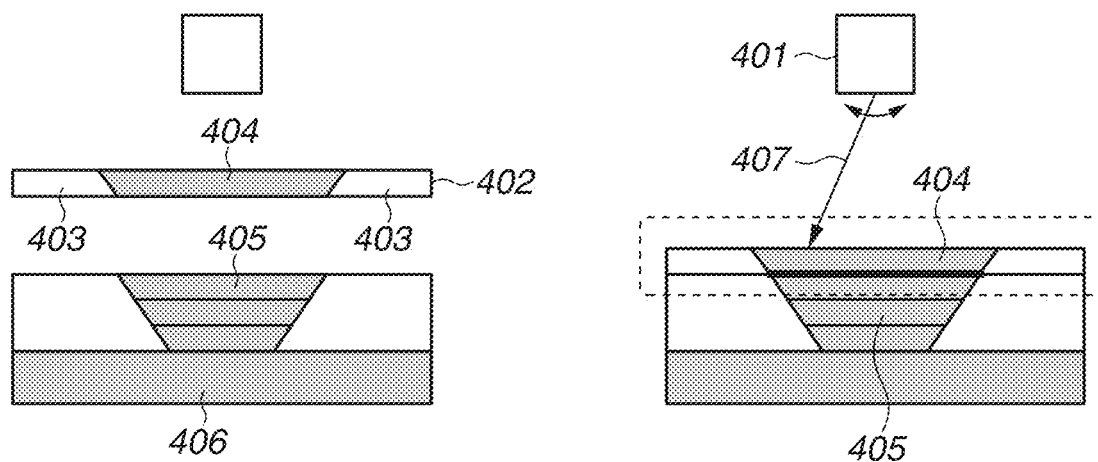
FIGS. 4A and 4B are diagrams illustrating examples of a modeling method according to the exemplary embodiment of the present invention.
Figure 4B:
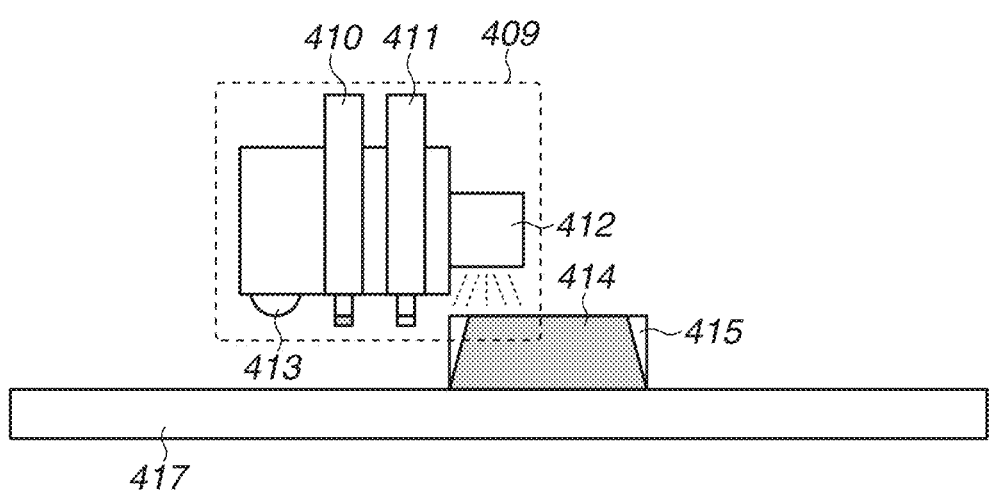

FIGS. 4A and 4B illustrate examples of modeling methods for performing additive manufacturing to which the exemplary embodiment of the present invention can be applied. Modeling apparatuses 102 that support the modeling methods described in the following examples can be managed by the management system 106.

FIG. 4A is a diagram illustrating a first example of a method for creating an object by material sheet lamination.

In this method, stacking of a material sheet 402 on a stage 406 and irradiation with energy 407 (such as light, heat, and ultraviolet rays) from an energy source 401 are repeated in the modeling unit 209 for additive manufacturing.

A material sheet 402 includes a modeling material 404 which actually makes the object, and a support material 403. The modeling material 404 is welded to a laminated object 405 (hereinafter, "the object 405") with the energy 407 (such as light, heat, and ultraviolet rays). The support material 403 is not welded to the object 405 and supports the object 405 from collapsing. For example, the support material 403 is soluble in water. When the object 405 is taken out, the support material 403 can be removed from the object 405 using water.

The modeling management unit 303 records the number of times of stacking of the material sheet 402 (number of stacked sheets) cumulatively counted since a start of use of the modeling apparatus 102, and stores the number of times of stacking into the storage device 204 as the layer counter information. Details will be described below. According to the exemplary embodiment of the present invention, the number of times of stacking cumulatively counted during the multiple 3D object-forming processing having been performed by the modeling apparatus since the start of use of the modeling apparatus, is used as an index for finding out a general operation status of the modeling apparatus 102. The number of times of stacking recorded here is then transmitted as the value of a total counter of the modeling apparatus 102 to the management system 106 via the monitoring apparatus.

The modeling management unit 303 can record and store the number of times of stacking in units of each object or each job into the storage device 204, aside from the number of times of stacking cumulatively counted since the start of use of the modeling apparatus. Information similar to such operation information described here includes information about the amount of the modeling material 404 supplied to the modeling unit 209 up to the completion of the object 405, and the volume of the object 405 calculated based on the modeling data (model data). Such information is also transmitted to the management system 106 via the monitoring apparatus for the purpose of reporting service.

A second example of the additive manufacturing technology is a stereolithographic method (not illustrated).

In this method, three steps, (1) stacking of a layered modeling material (such as ultraviolet curing resin) on a horizontal surface of a stage, (2) irradiation of energy (such as ultraviolet rays) to areas of which the modeling material are to be cured using a laser and (3) lowering of the stage, are repeated for gradual creating of the 3D object. Areas not irradiated with the ultraviolet rays are uncured and then remain on the stage. The uncured modeling material serves as support portions for preventing the laminated object from collapsing. When the modeling processing is completed, the support portions is removed, so that only the laminated object can be taken out.

The modeling management unit 303 records the number of times of stacking of the modeling material on the stage since a start of use of the modeling apparatus 102, and stores the number of times of stacking into the storage device 204 as the layer counter information. Again, in this modeling method, the number of times of stacking cumulatively counted since the start of use of the modeling apparatus is used as an index for identifying a general operation status of the modeling apparatus 102. The recorded number of times of stacking is then transmitted as the value of the total counter of the modeling apparatus 102 to the management system 106 via the monitoring apparatus.

The modeling management unit 303 records operation information from which the use amount of the modeling material for each object can be identified, and stores the operation information in the storage device 204. Examples of such operation information include the volume of the laminated object calculated based on the modeling data. The stored operation information is also transmitted to the management system 106 via the monitoring apparatus.

FIG. 4B is a diagram illustrating a third example of a method for forming an object, an inkjet method.

The modeling unit 209 forms an object on a stage 417 using an inkjet head 409. The inkjet head 409 includes a modeling material nozzle 410, a support material nozzle 411, an energy source 412, and a roller cutter 413. The energy source 412 irradiates energy for curing the modeling material. The roller cutter 413 adjusts the thickness of the object under additive manufacturing.

In this method, three steps, (1) jetting of fine particles from the modeling material nozzle 410 and the support material nozzle 411 to form a layer, (2) irradiation of the energy from the energy source 412 and (3) lowering of the stage 417, are repeated for gradual creating of the 3D object. The positions where the modeling material nozzle 410 and the support material nozzle 411 jet out particles are determined by coordinates specified by pieces of slice data based on respective modeling commands. Support portions 415 formed by curing the particles jetted from the support material nozzle 411 for the purpose of preventing an object 414 from collapsing can be removed after the modeling. The jetting of fine particles from the modeling material nozzle 410 and the support material nozzle 411 is followed by a step of scraping the surface formed of the jetted particles with the roller cutter 413 to adjust the thickness of the surface.

In this method, the stage 417 is lowered as many times as the number of stacked surfaces. The number of times of lowering of the stage 417 during the 3D object-forming processing can thus be handled as the number of times of stacking. The modeling management unit 303 records the number of times of stacking since a start of use of the modeling apparatus 102, and stores the number of times of stacking into the storage device 204 as the layer counter information. The recorded number of times of stacking is transmitted as the value of the total counter of the modeling apparatus 102 employing the inkjet method to the management system 106 via the monitoring apparatus.

The modeling management unit 303 can handle the numbers of times of jetting by the modeling material nozzle 410 and the support material nozzle 411 as operation information for identifying the attrition rates of the respective nozzles. The modeling management unit 303 therefore stores such information into the storage device 204 as well. The stored information is then transmitted to the management system 106 via the monitoring apparatus. Other operation information from which the use amount of the modeling material for each object can be identified is also stored in the storage device 204 and then transmitted to the management system 106 via the monitoring apparatus. Examples of such operation information include the volume of the laminated object calculated from the modeling data (model data).

A fourth example of the additive manufacturing technology is a modeling method called fused deposition modeling (FDM) (not illustrated).

The modeling unit 209 includes a stage and a modeling head for extruding a thermoplastic modeling material melt to a semi-liquid form. The modeling head stacks layers of the modeling material on the stage according to a plurality of pieces of slice data.

The modeling head is initially reciprocated in an X-axis direction (hereinafter, referred to as a main scanning direction) to stack a line of modeling material. Such an operation is repeated while shifting the modeling head in a Y-axis direction (hereinafter, referred to as a sub scanning direction) in succession, whereby a layer of sectional shape is stacked. The modeling head is controlled to move only within a range for which sectional shape data of the object on the stage exists, and extrude the modeling material. After the end of the extrusion molding according to a piece of slice data, the modeling head is moved up in a direction (Z-axis direction) perpendicular to the horizontal surface of the stage. The modeling head then performs extrusion molding according to the next piece of slice data.

In this method, the modeling head moves up in the Z-axis direction as many times as the number of stacked surfaces. The number of upward movements of the modeling head in the Z-axis direction during the 3D object-forming processing can thus be handled as the number of times of stacking. The modeling management unit 303 records the number of times of stacking since a start of use of the modeling apparatus 102, and stores the number of times of stacking into the storage device 204 as the layer counter information. The recorded number of times of stacking is transmitted as the value of the total counter of the modeling apparatus 102 employing the FDM method to the management system 106 via the monitoring apparatus.

The amount of the modeling material extruded from the modeling head can be handled as operation information for identifying the attrition rate of the modeling head. The modeling management unit 303 therefore stores such information into the storage device 204 as well. The stored information is transmitted to the management system 106 via the monitoring apparatus. Operation information from which the amount of the modeling material used for each object can be identified is also stored into the storage device 204 and then transmitted to the management system 106 via the monitoring apparatus. Examples of such operation information include the volume of the laminated object and the extruded amount of the modeling material calculated from the modeling data (model data).

Figure 5A:
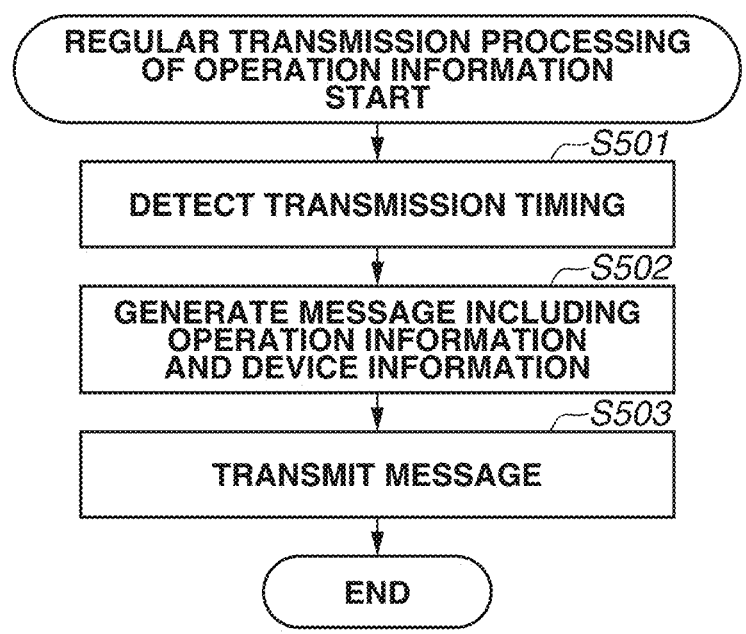
FIGS. 5A and 5B are flowcharts illustrating transmission processing of operation information about the modeling apparatus.
Figure 5B:
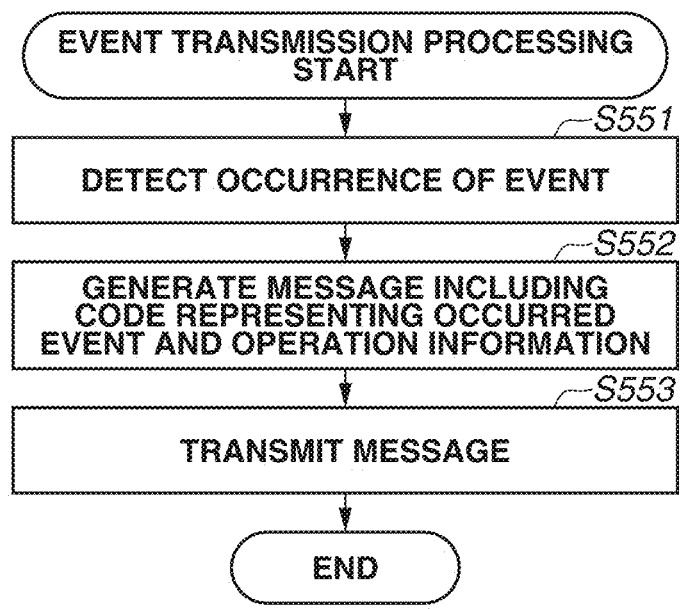

FIGS. 5A and 5B are flowcharts illustrating transmission processing of operation information about the modeling apparatus 102, performed by the monitoring apparatus. The processing is performed by executing a program for implementing the monitoring apparatus by the CPU in the modeling apparatus 102 or the information processing apparatus on which the monitoring apparatus runs.

To start management, the monitoring apparatus performs a communication test to check whether communication can be performed with the management system 106. The monitoring apparatus performs the communication test when instructed by the serviceperson of the sales company from the operation unit 208. If the communication test is successful, types of operation information to be collected and a regular transmission schedule are transmitted from the management system 106.

FIG. 5A is a flowchart for describing regular transmission processing of the operation information about the modeling apparatus 102, performed by the monitoring apparatus.

In step S501, the monitoring unit 306 detects a transmission timing of any one of pieces of operation information to be collected by the management system 106.

In step S502, the monitoring unit 306 obtains the intended operation information from the storage device 204 of the modeling apparatus 102. The generation unit 307 generates a message including the operation information obtained by the monitoring unit 306 and the device information about the modeling apparatus 102.

In step S503, the communication control unit 308 performs control to transmit the generated message including the operation information to the management system 106 via the network.

Examples of the operation information to be collected by the management system 106 include the number of times of stacking by the modeling unit 209, which is recorded as the layer counter information. For regular transmission of the number of times of stacking as the total counter value, in step S502, the generation unit 307 generates a message including information indicating the year, month, date, and time of acquisition and the value of the recorded number of times of stacking, as well as the device information such as the individual identification information, the model information, and the communication information. Such regular transmission is performed once a day at a fixed time, for example.

FIG. 5B is a flowchart illustrating transmission processing of operation information representing a failure event occurring in the modeling apparatus 102 (event transmission processing), performed by the monitoring apparatus. The operation information for the monitoring apparatus, which is to be transmitted by event transmission, among the pieces of operation information to be collected specified by the management system 106 is previously specified as a monitoring target.

In step S551, the monitoring unit 306 detects the occurrence of the event representing the operation information to be monitored, specified by the management system 106. Specifically, the monitoring unit 306 monitors the operation information recorded in the storage device 204 of the modeling apparatus 102. If the operation information serving as the monitoring target is detected to have been recorded, the monitoring unit 306 detects the occurrence of the event. The sensors of the modeling apparatus 102 may be configured to notify the monitoring unit 306 of the occurrence of the event.

Examples of the operation information serving as the monitoring target include an error representing a failure or abnormality, and a call representing a maintenance request from the user. Information representing the occurrence of replacement of a consumable is also included. Identification codes are assigned to such pieces of information, respectively. A code may include a sub code indicating the location of occurrence where the failure or the like occurs in the modeling apparatus 102.

In step S552, the generation unit 307 generates a message including the code representing the occurred event, information indicating the year, month, date, and time of occurrence, the value of the number of times of stacking as the total counter value at the time of occurrence, and the device information such as the individual identification information, the model information, and the communication information.

In step S553, the communication control unit 308 performs control to transmit the generated message to the management system 106 via the network.

In the case of event transmission of information about replacement of a consumable, the generated message further includes a name, an ID, and a serial number of the consumable, information indicating an attrition rate, and the date and time of previous replacement in addition to the foregoing information. In the case of replacement of a consumable containing a consumable material, the message includes the use amount or the remaining amount of the consumable material (modeling material) as the information indicating the attrition rate. In the case of the modeling head of the modeling unit 209 which is an example of a replaceable consumable, the message includes the number of times of jetting and the extruded amount of the modeling material as the information indicating the attrition rate.

Figure 6:
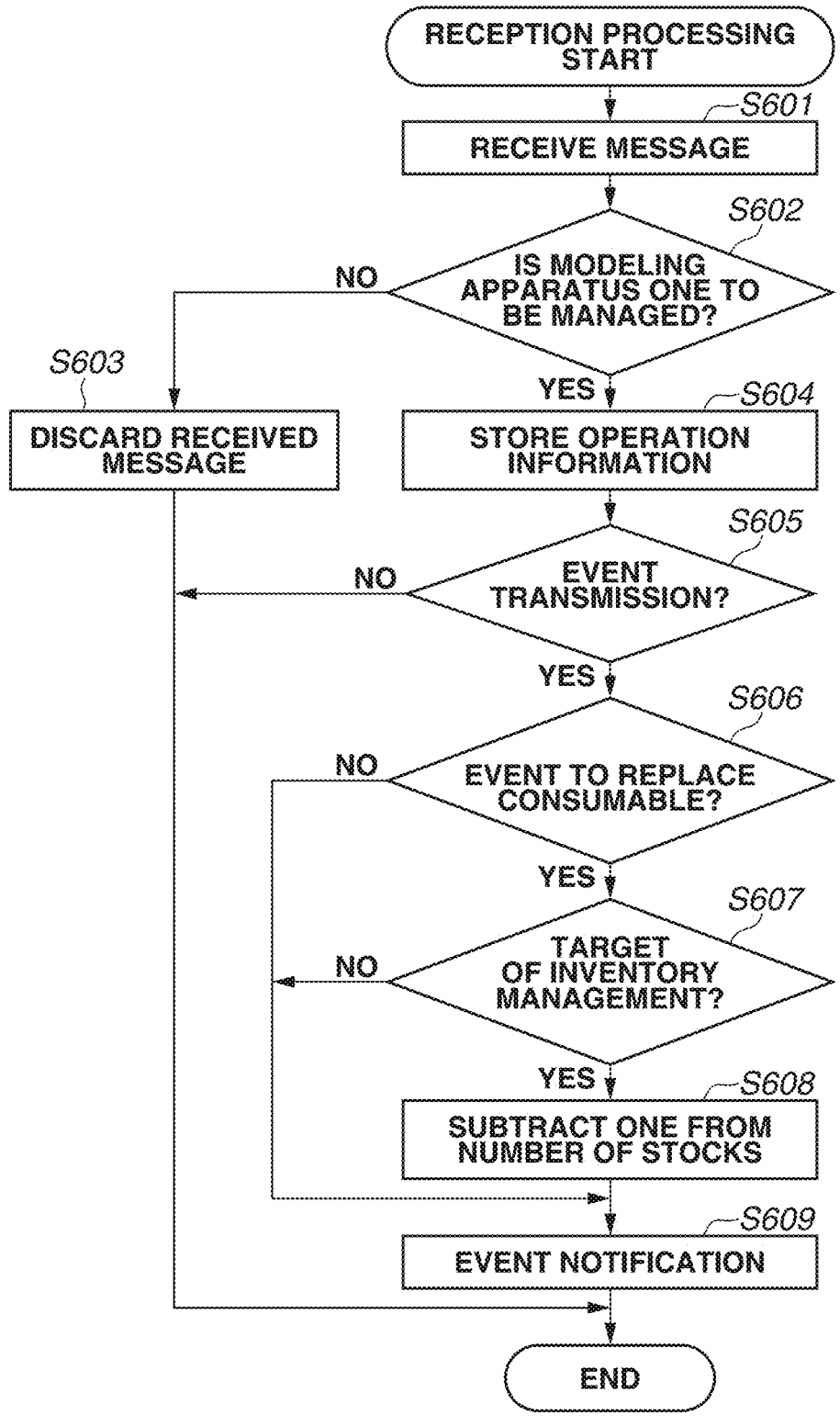
FIG. 6 is a flowchart illustrating reception processing of the operation information by the management system.

FIG. 6 is a flowchart illustrating reception processing of operation information by the management system 106. This processing is implemented by executing a program by the CPU 251 of the server computer constituting the management system 106.

In step S601, the communication unit 351 receives a message from an external apparatus, or the monitoring apparatus in the present exemplary embodiment. In step S602, the device information management unit 359 determines whether an apparatus indicated by the device information included in the message is one to be managed, based on a result of message analysis by the command analysis unit 354. If the modeling apparatus 102 is not one to be managed (NO in step S602), the processing proceeds to step S603. In step S603, the device information management unit 359 discards the received message. The processing is terminated. If the modeling apparatus 102 is one to be managed (YES in step S602), the processing proceeds to step S604. In step S604, the device information management unit 359 stores the operation information included in the received message into the storage device 254 or the storage service (not illustrated) on the network. The storage device 254 or the storage service stores and manages the operation information and information such as the date and time of acquisition in association with the individual identification information of the modeling apparatus 102.

In step S605, the device information management unit 359 determines whether the received message is transmitted by event transmission. If the received message is transmitted by event transmission (YES in step S605), the processing proceeds to step S606. If the received message is transmitted not by event transmission (NO in step S605), the processing is terminated.

In step S606, the device information management unit 359 determines whether the contents of the received message indicate an event to replace a consumable. The device information management unit 359 makes the determination by referring to the code included in the message. If the contents of the received message indicate an event to replace a consumable (YES in step S606), the processing proceeds to step S607. If the contents of the received message do not indicate an event to replace a consumable (NO in step S606), the processing proceeds to step S609.

In step S607, the device management unit 356 determines whether the consumable to be replaced is a target of inventory management by the consumable inventory management unit 361, based on the ID of the consumable included in the received message. If the consumable is determined to be a target of inventory management (YES in step S607), the processing proceeds to step S608. If the consumable is determined to not be a target of inventory management (NO in step S607), the processing proceeds to step S609. In step S608, the consumable inventory management unit 361 subtracts one from the number of remaining stocks of the consumable identified by the ID of the consumable. If the quantity of stocks after the subtraction processing satisfies a predetermined condition, the notification management unit 357 automatically distributes an email for requesting the serviceperson to deliver the consumable concerned.

In step S609, the device information management unit 359 performs notification processing about the details of the event that has occurred and corresponds to the code included in the received message. In the notification processing, the device information management unit 359 provides contents including the device information about the modeling apparatus 102, the details of the occurred event, the time of occurrence, and the number of times of stacking indicating the total counter value at the time of occurrence on the network via the WWW server program. The serviceperson can check such event information in real time by using a web browser. If the event that has occurred is a failure or a service call, the notification management unit 357 automatically transmits, as the notification processing, an email including the details of the event that has occurred to a mail address of the serviceperson of the modeling apparatus 102 in which the event has occurred. The email includes information such as the device information about the modeling apparatus 102, the time of occurrence of the event, the number of times of stacking indicating the total counter value at the time of occurrence.

The message received in step S601 may indicate that an event of the same contents has continued to occur from the same modeling apparatus 102. In such a case, in step S609, the device information management unit 359 suppresses the notification processing if a predetermined condition is satisfied. Specifically, if a value indicating a difference between the number of times of stacking included in the message received this time in step S601 and the number of times of stacking included in the message representing the previous occurrence of the event is smaller than a threshold value, the device information management unit 359 suppresses the notification processing related to the message received this time in step S601. The reason is that exactly the same fault may have been detected more than once due to erroneous detection of the sensors. Low-noise event notification processing can be performed by such processing using the number of times of stacking.

Figure 7:
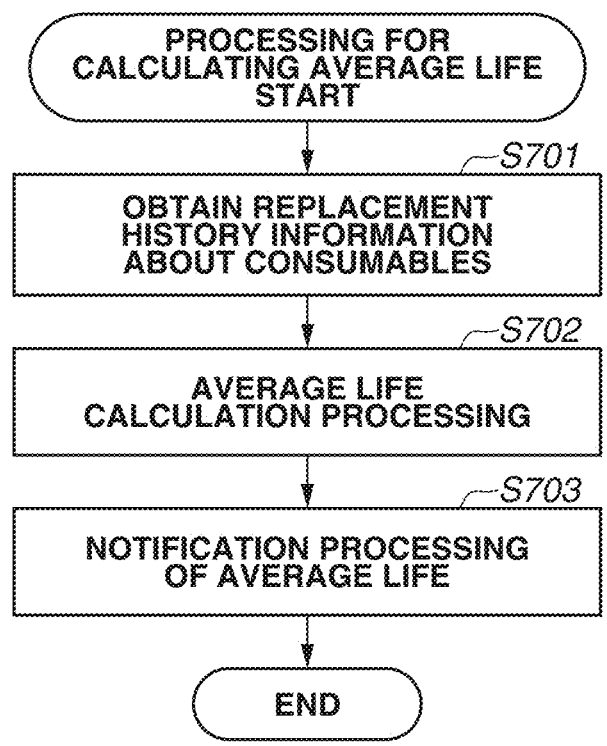
FIG. 7 is a flowchart illustrating processing for calculating an average life of each type of consumable.

FIG. 7 is a flowchart for describing processing in which the management system 106 calculates an average life of each type of consumable. This processing is implemented by executing a program by the CPU 251 of the server computer constituting the management system 106.

In step S701, the consumable life management unit 363 obtains replacement history information about the consumables based on a message including event information related to replacement of a consumable, received from the storage device 254 or the not-illustrated storage service on the network via the monitoring apparatus. If a message including the event information related to the replacement of a consumable is received from the same transmission source a plurality of times, the consumable life management unit 363 analyzes the contents of the messages. If the serial numbers are different, the consumable life management unit 363 determines that the consumable has been replaced. Based on the determination, the device information management unit 359 records the number of times of stacking included in the message from which the replacement is determined as the value of the total counter at the time of replacement of the consumable.

In step S702, the consumable life management unit 363 calculates an average life of each type of consumable by using the replacement history information about the consumables. The type of consumable can be identified by the consumable ID. Average life calculation processing is performed by the following equation:

"Average life"=Σ((total counter at current replacement of consumable)−(total counter at previous replacement of consumable))/the number of times of replacement.

In step S703, the device information management unit 359 performs notification processing of the average life calculated by the consumable life management unit 363. In the notification processing, the average life of each type of consumable identified by the consumable ID is provided on the network via the WWW server program. The serviceperson or a person in charge from the manufacturer of the modeling apparatus 102 can find out the average lives of the consumables in actual operation using a web browser.

Based on the processing result of FIG. 7, an analysis can be made to enable systematic manufacturing and delivery arrangement of the consumables for the future.

Figure 8:
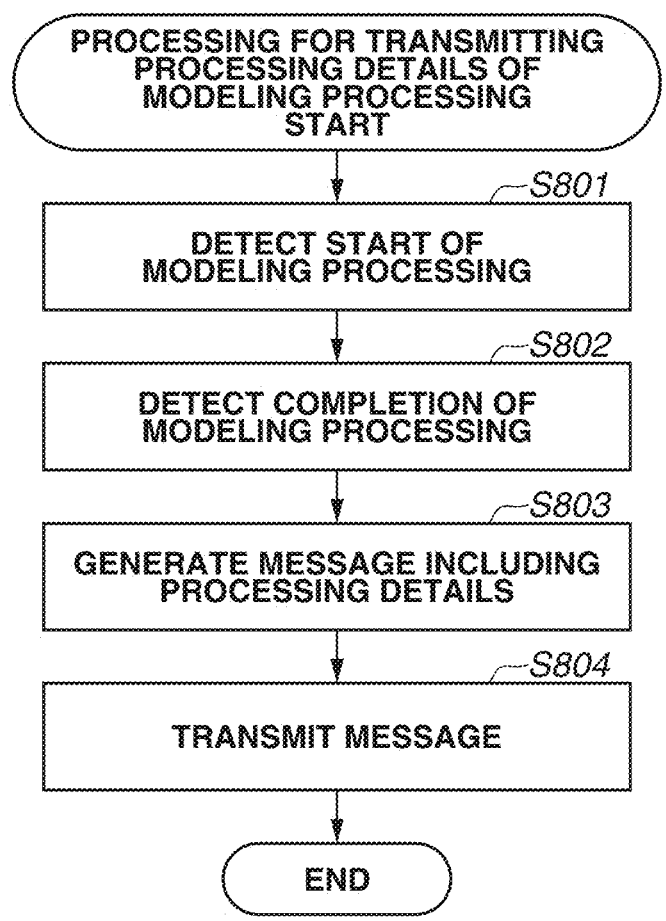
FIG. 8 is a flowchart illustrating processing in which a monitoring apparatus transmits information indicating details of modeling processing.

FIG. 8 is a flowchart illustrating processing in which the monitoring apparatus transmits information about processing details of the 3D object-forming processing when the modeling apparatus 102 completes a single round of 3D object-forming processing based on model data. This processing is implemented by executing a program for implementing the monitoring apparatus by the CPU in the modeling apparatus 102 or the information processing apparatus on which the monitoring apparatus runs. A plurality of 3D objects may be created by a single round of forming processing.

In step S801, the device information management unit 305 detects a start of a 3D object-forming processing according to a notification from the modeling management unit 303. The device information management unit 305 records the time (year, month, date, and time) when the forming processing is started, and the number of times of stacking stored in the storage device 204 as the layer counter information at the time of start.

In step S802, the device information management unit 305 detects the completion of the modeling processing according to a notification from the modeling management unit 303. The device information management unit 305 records the time (year, month, date, and time) when the modeling processing is completed, and the number of times of stacking stored in the storage device 204 as the layer counter information value at the time of completion.

In step S803, the device information management unit 305 obtains the amounts of consumable materials (modeling material and support material) supplied by the consumable material replenishment unit 212 during the 3D object-forming processing, recorded in the storage device 204. The generation unit 307 generates a message including information indicating the obtained supply amounts of the consumable materials. The generated message further includes a filename of the model data subjected to the 3D object-forming processing, an owner name of the model data, the time (year, month, date, and time) when the modeling processing is started, the number of times of stacking indicating the total counter value at the time of start, the time (year, month, date, and time) when the modeling processing is completed, and the number of times of stacking indicating the total counter value at the time of completion.

In step S804, the communication control unit 308 performs control to transmit the generated message to the management system 106 via the network. The management system 106 uses the message for the purpose of reporting the use amounts of the consumable materials for each round of 3D object-forming processing and for billing purposes.

APPLICATION EXAMPLES

The timing of regular maintenance of the modeling apparatus 102 by the serviceperson has conventionally been determined on a time basis, like once in every month.

According to an exemplary embodiment of the present invention, the number of times of stacking serving as a total counter value from which the operation status of the modeling apparatus 102 since a start of use can be comprehensively found out is transmitted from the management system 106 on a regular basis. This enables flexible response in terms of the timing of regular maintenance. For example, if the number of times of stacking after the previous maintenance is greater than expected, the serviceperson can come for maintenance earlier than usual.

The management system 106 can register the year, month, date, and time when the serviceperson does maintenance. The device information management unit 305 of the management system 106 automatically calculates a change in the value of the number of times of stacking serving as the total counter value every day based on the value of the number of times of stacking regularly transmitted on the day of maintenance and the value of the number of times of stacking regularly transmitted afterward. If the calculated amount of change is determined to exceed a predetermined value, the notification management unit 357 automatically transmits an e-mail for prompting maintenance to the address of the serviceperson.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising:
a monitoring apparatus configured to monitor a modeling apparatus configured to form a three-dimensional object, wherein the modeling apparatus performs forming processing of a plurality of three-dimensional objects according to a plurality of jobs; and
a management system configured to communicate with the monitoring apparatus via a network,
wherein the monitoring apparatus includes:
an acquisition unit configured to acquire a number of layers for each job recorded in a storage unit of the modeling apparatus, wherein a number of layers for one job indicates a cumulative number of layers stacked in forming processing of the job performed by the modeling apparatus,
a generation unit configured to generate a message including identification information for identifying the modeling apparatus and information indicating the acquired number of layers for each job, and
a transmission unit configured to transmit the generated message to the management system, and
wherein the management system receives the message from the monitoring apparatus and stores the identification information and the information indicating the number of layers for each job in a storage service.

2. The system according to claim 1, wherein the modeling apparatus further records volume data of each of the three-dimensional objects formed according to the plurality of jobs, and
wherein the acquisition unit is further configured to acquire the volume data, the generation unit is configured to generate a message including the acquired volume data and the transmission unit is configured to transmit the generated message to the management system.

3. The system according to claim 1, wherein the modeling apparatus further records material data used in each of the three-dimensional objects formed according to the plurality of jobs, and
wherein the acquisition unit is further configured to acquire the material data, the generation unit is configured to generate a message including the acquired material data and the transmission unit is configured to transmit the generated message to the management system.

4. The system according to claim 1, wherein the transmission unit is configured to transmit the message on a regular basis according to a schedule specified by the management system.

5. The system according to claim 1,
wherein the generation unit is configured to, if an event has occurred in the modeling apparatus, generate a message including information representing the event that has occurred, information indicating a time when the event has occurred and the identification information for identifying the modeling apparatus, and
wherein the transmission unit is configured to transmit, to the management system, the generated message according to the occurrence of the event in the modeling apparatus.

6. The system according to claim 1, wherein the monitoring apparatus is built in the modeling apparatus.

7. The system according to claim 1, wherein the monitoring apparatus transmits the message to the management system by using the hypertext transfer protocol secure (HTTPS).

8. The system according to claim 1, wherein the management system automatically performs a notification for a maintenance of the monitoring apparatus based on the received message.

9. The system according to claim 1, wherein the modeling apparatus further records a total number of layers recorded in the storage unit of the modeling apparatus,
wherein the total number of layers indicates a cumulative number of layers stacked in the forming processing of the plurality of three-dimensional objects corresponding to the plurality of jobs performed by the modeling apparatus, and
wherein the acquisition unit is further configured to acquire the total number of layers, the generation unit is configured to generate a message including the acquired total number of layers and the transmission unit is configured to transmit the generated message to the management system.

10. A method for a system including a monitoring apparatus configured to monitor a modeling apparatus configured to form a three-dimensional object, wherein the modeling apparatus performs forming processing of a plurality of three-dimensional objects according to a plurality of jobs, and a management system configured to communicate with the monitoring apparatus via a network, the method comprising:
acquiring, by the monitoring apparatus, a number of layers for each job recorded in a storage unit of the modeling apparatus, wherein a number of layers for one job indicates a cumulative number of layers stacked in forming processing of the job performed by the modeling apparatus;
generating, by the monitoring apparatus, a message including identification information for identifying the modeling apparatus and information indicating the acquired number of layers for each job;
transmitting, by the monitoring apparatus, the generated message to the management system;
receiving, by the management system, the message from the monitoring apparatus; and
storing, by the management system, the identification information and the information indicating the number of layers for each job in a storage service.

11. A modeling apparatus for performing forming processing of a three-dimensional object according to a job, comprising:
a storage unit;
at least one memory storing instructions; and
at least one processor executing the instructions causing the modeling apparatus to:
record first operation information of each job in the storage unit, wherein the first operation information includes date information and a number of layers for one job, the number of layers indicating a cumulative number of layers stacked in forming processing of the one job;
transmit the first operation information to a monitoring apparatus, wherein the first operation information is transmitted from the monitoring apparatus to a management system via a network;
record second operation information in the storage unit as usage counter information of the modeling apparatus; and transmit the second operation information to the monitoring apparatus, wherein the second operation information is transmitted from the monitoring apparatus to the management system via the network.

12. The modeling apparatus according to claim 11, wherein, as the second operation information, a total number of layers is recorded in the storage unit, and
wherein the total number of layers indicates a cumulative number of layers stacked in forming processing of a plurality of three-dimensional objects corresponding to a plurality of jobs which the modeling apparatus has performed.

13. The modeling apparatus according to claim 11, wherein the first operation information further includes volume data of a three-dimensional object formed according to the one job.

14. The modeling apparatus according to claim 11, wherein the first operation information further includes material data used in a three-dimensional object formed according to the one job.

15. A method for a modeling apparatus performing forming processing of a three-dimensional object according to a job, the method comprising:
recording first operation information of each job in a storage unit of the modeling apparatus, wherein the first operation information includes date information and a number of layers for one job, the number of layers indicating a cumulative number of layers stacked in forming processing of the one job;
transmitting the first operation information to a monitoring apparatus, wherein the first operation information is transmitted from the monitoring apparatus to a management system via a network;
recording second operation information in the storage unit as usage counter information of the modeling apparatus; and
transmitting the second operation information to the monitoring apparatus, wherein the second operation information is transmitted from the monitoring apparatus to the management system via the network.

16. The method according to claim 15, wherein, as the second operation information, a total number of layers is recorded in the storage unit, and
wherein the total number of layers indicates a cumulative number of layers stacked in forming processing of a plurality of three-dimensional objects corresponding to a plurality of jobs which the modeling apparatus has performed.

17. The method according to claim 15, wherein the first operation information further includes volume data of a three-dimensional object formed according to the one job.

18. The method according to claim 15, wherein the first operation information further includes material data used in a three-dimensional object formed according to the one job.

19. A non-transitory computer readable storage medium on which is stored a computer program for making a computer execute a method for a modeling apparatus performing forming processing of a three-dimensional object according to a job, the method comprising:
recording first operation information of each job in a storage unit of the modeling apparatus, wherein the first operation information includes date information and a number of layers for one job, the number of layers indicating a cumulative number of layers stacked in forming processing of the one job;
transmitting the first operation information to a monitoring apparatus, wherein the first operation information is transmitted from the monitoring apparatus to a management system via a network;
recording second operation information in the storage unit as usage counter information of the modeling apparatus; and
transmitting the second operation information to the monitoring apparatus, wherein the second operation information is transmitted from the monitoring apparatus to the management system via the network.

20. The non-transitory computer readable storage medium according to claim 19, wherein, as the second operation information, a total number of layers is recorded in the storage unit, and
wherein the total number of layers indicates a cumulative number of layers stacked in forming processing of a plurality of three-dimensional objects corresponding to a plurality of jobs which the modeling apparatus has performed.

21. The non-transitory computer readable storage medium according to claim 19, wherein the first operation information further includes volume data of a three-dimensional object formed according to the one job.

22. The non-transitory computer readable storage medium according to claim 19, wherein the first operation information further includes material data used in a three-dimensional object formed according to the one job.

* * * * *